Nov. 2, 1965    H. KRAMER    3,215,025
PUSH-ON RETAINERS
Filed Dec. 3, 1963
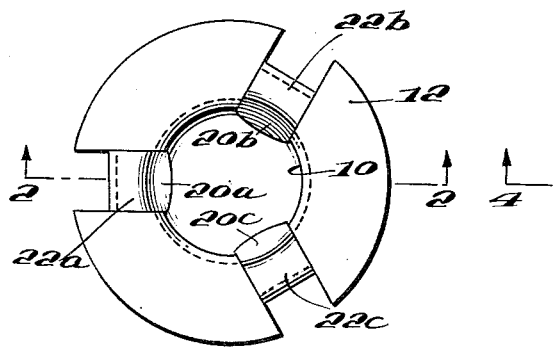
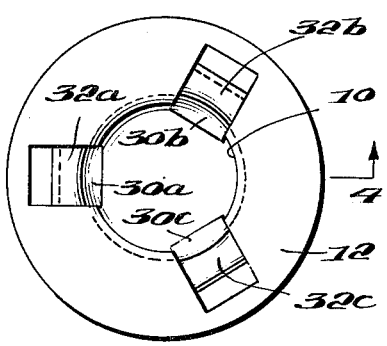
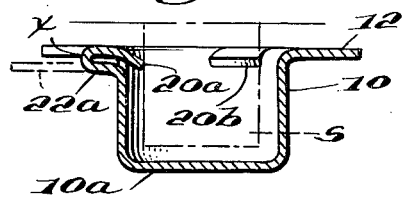
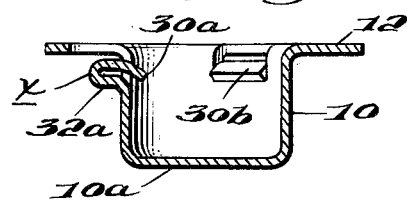
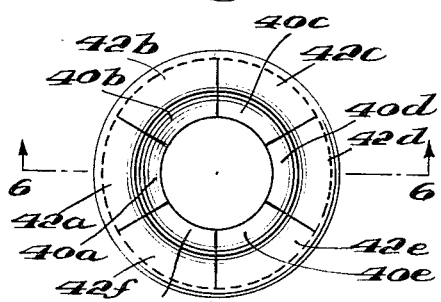
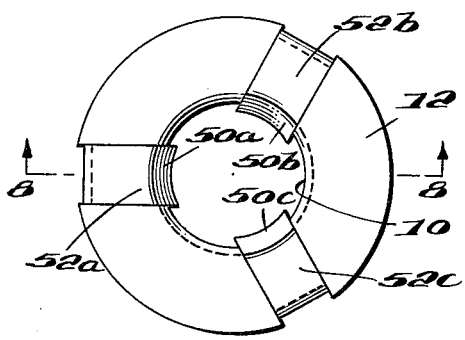
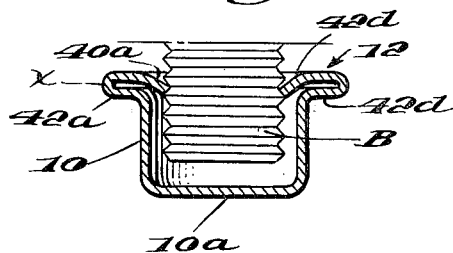
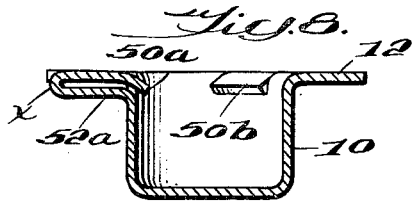
INVENTOR
HYMAN KRAMER,
BY
ATTORNEY

United States Patent Office 3,215,025
Patented Nov. 2, 1965

3,215,025
PUSH-ON RETAINERS
Hyman Kramer, 2764 E. 16th St., Brooklyn, N.Y.
Filed Dec. 3, 1963, Ser. No. 327,672
5 Claims. (Cl. 85—35)

This invention relates to improvements in push-on retainers, and more particularly to an improved fastening and/or retaining device characterized by general cap-form configuration and which is capable of self-locking itself to a carrier member such as a shaft, spindle stud, threaded bolt, or the like as an incident to its being simply pushed, usually by hand, over the end of said carrier member in end-capping relation thereon.

Push-on retainers or cap configuration and having spring locking prongs struck out from the material of the crown portion thereof adjacent its junction with the radial retaining flange portion of the retainer and which thus extend generally axially along their carrier member have quite recently come on the market for use in place of the more conventional, widely used annular retaining rings. However, since the ability of the locking prongs of such a push-on retainer to flex within the small annular space available to them between the inner periphery of their crown portion and the outer periphery of the carrier member, i.e. shaft, etc., into the surface of which the free ends of the prongs must bite if they are to exercise their intended locking action, is very limited and moreover, because locking prongs which are disposed so as to extend generally along the carrier member rather than being disposed at a more favorable "coning angle" with respect thereto, lack security of holding power, the prior push-on cap-form retainers can be used only in those applications wherein the retainer is called upon to take or resist relatively small axial thrust loads.

Stated broadly, a major object of the invention is the provision of an improved push-on, cap-form retainer having substantially increased holding power and thereby greater security of attachment to its carrier member when assembled thereto than existing push-on retainers of the same general type.

A more particular object of the invention is the provision of a cap-form retaining device capable of self-locking itself to a carrier member such as a shaft, spindle, stud or the like when simply pushed thereonto, with a degree of security which insures that the device will take heavy thrust loads.

Another object of the invention is the provision of a cap-form fastening device incorporating locking prongs capable of self-locking themselves and thereby the device to a carrier member such as a shaft, spindle or the like, wherein the design and disposition of said prongs are more favorable to their giving greater locking action, and hence greater security of holding power, than the locking prongs of existing cap-form retainer devices of generally similar type.

The above and other objects and features of advantage of a push-on cap-form retainer according to the present invention will appear from the following detailed description, in which reference is had to the accompanying drawings illustrating various forms thereof, in which:

FIG. 1 is a plan view of one form of retainer of the invention, looking into the open end of the crown portion and onto the working face of the retaining flange portion thereof;

FIG. 2 is a section taken on line 2—2 of FIG. 1;

FIGS. 3, 5 and 7 are views similar to FIG. 1 but which illustrate modified locking prong construction and disposition according to the present invention; and FIGS. 4, 6 and 8 are sections taken along lines 4—4, 6—6 and 8—8 of the aforesaid FIGS. 3, 5 and 7.

Referring to the drawings in greater detail, all views thereof show that a retainer as herein proposed basically comprises a crown portion 10 and a retaining-flange portion 12 (hereinafter for simple terminology referred to as the crown and the retaining flange, respectively) and integral locking prongs (to be individually designated according to the four illustrated forms thereof), which enable the retainer to self-lock itself to a carrier member such as a shaft, spindle, stud or the like S (FIG. 2) or to a threaded bolt B (FIG. 6) upon the retainer being simply pushed, usually by hand, over the end thereof.

In all of the illustrated retainer forms, the crown is shown to be closed at one end 10a and its body portion is formed cylindrical and with internal diameter somewhat greater than that of the external diameter of the carrier member S or B to which the retainer is intended to be associated, whereby said retainer may be readily assembled to the carrier member with simply a push-on motion. Similarly in all of the illustrated retainer forms, the retainer flange 12 extends radially outwardly from the open end of the crown 10 and preferably is disposed at a right angle to the axis of said crown. As will be understood by those versed in the art of retainers, the radial retaining flange 12 will have the requisite external diameter and stiffness enabling it to serve as a radial abutment or locating shoulder on the carrier member for retaining various machine parts or elements in a predetermined axial position thereon.

According to the present invention, and in contrast to the manner of formation and to the disposition of the locking prongs of known push-on cap-type retainers, the aforesaid locking prongs of a retainer as herein proposed are formed of radially extending strip-form areas severed from both the retaining flange 12 and the wall of the crown portion 10 and which are connected at their inner ends to the crown wall and are further bent throughout an angle of approximately 180° on themselves intermediate their length so as to provide overlying free end portions which extend into the interior of said crown portion, which ends are spaced axially from the lines of connection of said strip-form areas with the crown wall in the direction of said retaining flange 12. More particularly, and now referring specifically to the FIGS. 1 and 2 form of retainer, the locking prongs designated 20a, 20b, 20c comprise the inner free ends of radial tabs 22a, 22b, 22c, which are blanked or struck out from the material of the retaining flange and to a substantially lesser extent from the material of the base or root portion of the crown extending adjacent the juncture of the retaining flange 12 therewith. That is to say, said radial tabs 22a, 22b, 22c are defined by parallel lines of cut which extend inwardly from the outer edge of the retaining flange 12 throughout the full width of said flange and thence into the wall of the crown portion a small distance which is such as to give the tabs length somewhat greater than the radial width of said flange by an amount which corresponds substantially to the distance that said locking prongs 20a, 20b, 20c project into the circle of the crown 10.

The inwardly projecting free ends of the tabs which constitute the aforesaid locking prongs 20a, 20b, 20c, either in a prior operation or following bending or infolding of the tabs as aforesaid, are "coned" inwardly of the crown by an angle that does not exceed the so-called "friction angle." By the term "friction angle" as herein employed is meant the angle at which the friction exerted on the free end of the prongs tends to decrease as the retainer is being moved over the end of the shaft while being assembled thereto, that is, in direction to increase said angle, and at which the friction tends to increase when the retainer is moved or tends to move in the opposite direction, as under thrust loads applied to the retaining flange 12. Of course it will be understood that said locking prongs extend into the interior circle of the crown of the retainer by an amount such that the edges of their free ends lie on a circle which has slightly smaller diameter than that of the carrier element (S or B) on which the retainer is to be assembled.

Accordingly, with the coning angle given to the locking prongs 20a, 20b, 20c corresponding substantially to that of the aforesaid friction angle, and with the length of the prongs properly dimensioned, as stated above, cap-form retainers according to the invention may be readily assembled on the ends of carrier members such as a shaft, spindle, stud or the like with relative facility by being simply pushed thereon, due to the ability of the locking prongs to flex relatively outwardly, and thereupon to become self-locking to a degree that they are capable of taking thrust loads to which the retainer as a whole, and more particularly the retaining flange 12 thereof, may be subjected to by the machine part being secured by the retainer, up to the point of the material of the carrier element against which the free ends of the locking prongs 20a, 20b, 20c grip itself giving away.

The advantages of the above described locking prong construction over the prong construction of existing push-on cap type retainers are believed to be self-evident. In the first place, the folded-over construction of the prongs 20a, 20b, 20c throughout their major length portions adds appreciable strength thereto, without at the same time detracting from their ability to flex as may be required. Another very important advantage is that, since the prongs extend substantially at right angles to the axis of the carrier member which they engage, they are more favorably disposed to exert their locking action thereon than locking prongs which extend generally axially along said carrier member. Yet despite their right-angular disposition, the prongs retain sufficient flexibility as a whole as permits easy assembly of the retainer on which they are formed to a carrier member with a simple push-on motion.

Referring now to FIGS. 3 and 4, which illustrate a somewhat modified form of construction, here the tabs 32a, 32b, 32c, whose inner free ends comprise the locking prongs 30a, 30b, 30c, are struck out from the retainer flange and from the base or root zone of the crown 10, as earlier described in connection with the FIGS. 1 and 2 form, but said tabs do not cut through the outer circular edge of the retainer flange 10 as with the prior described form, and to provide them with their requisite length, the tabs are cut deeper into the cylindrical wall of the retainer crown 10. Thus, when the outer ends of said tabs are folded inwardly over their inner-end portions along the lines of fold designated X, their in-folded end portions lie in a plane which is displaced slightly from that of the retaining flange 10. However, despite this structural difference, the locking prong construction according to the FIGS. 3 and 4 form has all of the advantages of that previously described in connection with the FIGS. 1 and 2 form of retainer, and it affords the further advantage in the final structure of maintaining the retaining flange 10 continuous along its outer edge, which is of course desirable in heavy-thrust load applications of the retainer.

Whereas in each of the already described forms of the cap-form retainer, three locking prongs symmetrically disposed on radial center lines which are spaced 120° apart about the circumference of the retainer are relied upon, FIGS. 5 and 6 illustrate the somewhat different arrangement of locking-prong tab construction by which the prongs extend throughout the full periphery of the crown opening. More particularly, the locking prongs here designated 40a–40f inclusive are six in number and each subtends an arc of 60°. Thus the prongs have arcuate width such that, although independent of one another, they are disposed in close adjacency. Illustratively, the locking tabs 42a–42f inclusive, whose inner free ends constitute said locking prongs, are formed as by striking them out to proper truncated segmental configuration from a cylindrical extension on the outer peripheral edge of the retaining flange 10, and then bending said tabs radially inwardly about a circular line of fold corresponding to that of the outer circular edge of the retaining flange. This FIGS. 5 and 6 prong construction of course results in a very strong retaining flange 10, inasmuch as it has double thickness throughout its entire radial width.

FIGS. 7 and 8 illustrate yet another form of prong construction which incorporates some of the features of each of the previously described FIGS. 1 and 2 and the FIGS. 5 and 6 forms of locking prong construction. That is to say, the tabs 52a, 52b, 52c, whose inner free ends 50a, 50b, 50c comprise the locking prongs proper, are fashioned partly from tab portions struck out from the material of the retaining flange 12 and to a lesser degree of the crown 10, as with the FIGS. 1 and 2 form, and in part from extension tab portions which extend radially outwardly from said flange a distance substantially equaling its radial width. This added length of the tabs 50a, 50b, 50c, permits of their outer end portions being infolded along lines of fold X which correspond generally to the outer peripheral edge line of the retainer flange 10 (or tangents thereof), with the result that the infolded ends of the tabs from which the locking prongs extend, in addition to lying in the plane of the retainer flange 12, substantially completely fill the radial slot-like openings in the flange resulting from the initial striking out of the tabs therefrom.

Thus, the FIGS. 7 and 8 form has all of the advantages of the FIGS. 1 and 2 form, plus the further advantage of the retaining flange 12 being substantially continuous throughout both its circumference and its radial depth.

It is to be noted that whereas FIG. 2 diagrammatically illustrates the retainer therein shown as being assembled to a smooth-surfaced carrying member such as a shaft, spindle, stud or the like, and FIG. 6 illustrates the retainer of the form therein shown as being assembled to the end of a carrier member having threads, such as a bolt, each of the illustrated forms is adapted for use either as in FIG. 2 or as in FIG. 6. However, for use with a threaded bolt as in FIG. 6, the locking prongs will be arranged to lie on a helix corresponding to the pitch of the threads of the bolt with which it is to be assembled, thus to function as a cap nut.

It is also within the purview of the invention to employ any one of the illustrated retainer forms as a sheet metal nut rather than as a cap nut, simply by aperturing the bottom wall 10a of the retainer crown portion 10, as permits the end of a bolt to move through the same as the retainer, now being used as a push-on sheet-metal nut, is pushed over said end to its final position axially therealong.

As many changes could be made in carrying out the above constructions without departing from the scope of the invention, it is intended that all matter contained in the above description or shown in the accompanying drawing shall be interpreted as illustrative and not in a limiting sense.

I claim:

1. A cap-form retainer device adapted to be assembled to a carrier member such as a shaft, stud, bolt or the like by means of a push-on assembly operation, said retainer comprising a cylindrical crown portion having internal diameter greater than the external diameter of said carrier member and an integral retaining flange extending radially outwardly from the open end thereof, and locking prongs extending into the interior of said crown portion and having length and being arranged at an inclination to the axis thereof which are such that said prongs will flex outwardly during push-on assembly of the retainer device with said carrier member but will thereupon grippingly engage said member to prevent removal of the retaining device therefrom, said locking prongs comprising strip-form areas severed from both said retaining flange and said crown portion and extending radially therefrom and being bent approximately 180° on themselves intermediate their length so as to provide overlying portions terminating in free ends which extend into the interior of said crown portion, and said free ends being spaced axially below the lines of connection of said strip-form areas with the crown portion in the direction of the retainer flange.

2. A retainer device according to claim 1, wherein said strip-form areas are bent along transverse lines of bend which are disposed closely adjacent the outer edge of said retaining flange.

3. A retainer device according to claim 1, wherein said strip-form areas and the locking-prong ends thereof are disposed substantially in the plane of said retaining flange.

4. A retainer device according to claim 1, wherein said strip-form areas and the locking prong ends thereof are displaced a small distance out of the plane of said retaining flange.

5. A retainer device according to claim 1, wherein said strip-form areas further include root-end portions which are displaced a small distance out of the plane of said retaining flange and inner prong-end portions which lie in the plane of said retaining flange.

References Cited by the Examiner
UNITED STATES PATENTS

| | | | |
|---|---|---|---|
| 1,613,654 | 1/27 | Griffith | 85—35 |
| 2,342,690 | 2/44 | Place | 85—36 |
| 2,880,641 | 4/59 | Sislik | 85—35 |

CARL W. TOMLIN, *Primary Examiner.*

EDWARD C. ALLEN, *Examiner.*